UNITED STATES PATENT OFFICE 2,362,057

PROCESSES FOR PRODUCTION OF THIONYL CHLORIDE

John P. Edwards, Niagara Falls, N. Y., assignor to Hooker Electrochemical Company, Niagara Falls, N. Y., a corporation of New York No Drawing. Application August 11, 1943, Serial No. 498,261

7 Claims. (Cl. 23—203)

Heretofore thionyl chloride has been produced by reaction of sulphuric acid or sulphur trioxide with sulphur monochloride and chlorine or with sulphur dichloride. The reaction of sulphuric acid with these chlorides of sulphur is as follows:

$$4H_2SO_4 + 3S_2Cl_2 + 5Cl_2 \rightarrow 4SOCl_2 + 6SO_2 + 8HCl \quad (1)$$

$$4H_2SO_4 + 6SCl_2 + 2Cl_2 \rightarrow 4SOCl_2 + 6SO_2 + 8HCl \quad (2)$$

The reaction of sulphur trioxide with these chlorides of sulphur is as follows:

$$2SO_3 + S_2Cl_2 + Cl_2 \rightarrow 2SOCl_2 + 2SO_2 \quad (3)$$

$$2SO_3 + 2SCl_2 \rightarrow 2SOCl_2 + 2SO_2 \quad (4)$$

Reactions (1) and (2) are generally unsatisfactory because of the fact that for every molecule of $SOCl_2$ two molecules of HCl are produced. The HCl comes off mixed with $SO_2$, from which it must be separated, and there is not always a sufficient demand for this by-product. Sulphur trioxide as such is expensive and Reactions (3) and (4) are commonly carried out by means of $SO_3$ evolved from oleum. As the heat of reaction is considerable and $SO_3$ boils at about 45° C., it is reacted in gas phase. In the case of Reaction (3) chlorine is passed in at the same time to avoid production of sulfuryl chloride and pyrosulfuryl chloride.

I have now discovered that instead of evolving $SO_3$ from oleum for use in the above reactions, the oleum itself may be advantageously used directly in the reactions. Assuming oleum containing 70 per cent $SO_3$, the reactions are as follows:

$$6(H_2SO_4 \cdot 2.83SO_3) + 13S_2Cl_2 + 16Cl_2 \rightarrow$$
$$22.98SOCl_2 + 25.98SO_2 + 12HCl \quad (5)$$

$$6(H_2SO_4 \cdot 2.83SO_3) + 26SCl_2 + 3Cl_2 \rightarrow$$
$$22.98SOCl_2 + 25.98SO_2 + 12HCl \quad (6)$$

It is to be understood that Reactions (5) and (6) may be combined by using a mixture of sulphur monochloride and dichloride.

It should be noted that in these reactions the $SO_3$ is reacted in liquid phase. This results in more intimate contact and a consequent reduction of about one half in the time of reaction, namely from 100 hours to from 45 to 50 hours. It also results in a better yield with respect to the $SO_3$. Moreover, it will be observed by comparison of Reactions (1) and (2) with Reactions (5) and (6) that the quantity of by-product HCl is decreased from a ratio of two molecules of HCl to one of $SO_3$ to a ratio of one molecule of HCl to nearly two of $SOCl_2$; or, in other words, the molecular proportion of HCl produced for a given quantity of $SOCl_2$ is decreased to a little more than one quarter of that produced in the reaction with sulphuric acid alone, which is the only reaction of the prior art that is practicable for carrying out in liquid phase. Besides the saving in time, improved yield and reduction in by-product HCl, a further practical advantage as compared with the process in which $SO_3$ is evolved from the oleum is that no $H_2SO_4$ is left over to be shipped back to the manufacturer of the oleum.

Reactions (5) and (6) are preferably carried out in a glass-lined, jacketed, iron reactor, equipped with an agitator, manometer, thermometer well exits for $SO_2$ and HCl and a reflux condenser. There must also be a chlorine inlet tube, which should extend to near the bottom of the reactor. The oleum should have as high a content of $SO_3$ as practicable and should preferably be liquid. In order to minimize production of higher oxides of $SCl_2$, e. g., sulfuryl and pyrosulfuryl chloride, and afford better control of the reaction, which is otherwise quite violent, the oleum is preferably added gradually to a body of the chlorides of sulphur, so that the latter may be in large excess until near the finish of the reaction. The sulphur monochloride or dichloride is therefore first charged into the reactor. If desired, antimony trichloride may be added to serve as catalyst. With the agitator working and cooling water flowing in the reactor jackets, the oleum is added at such a rate that the temperature is kept below 45° C., and preferably at substantially 25° C. The admission of chlorine may be started at the same time or later, depending upon whether sulphur monochloride or dichloride is the other reagent. At the finish it is desirable that there should be a slight excess of both oleum and chlorine in the mixture, over the theoretical quantities.

After the optimum quantities of oleum and chlorine have been added the charge is heated by passing steam through the reactor jacket and refluxed until the refluxing temperature has become stabilized at substantially 75° C., which is the boiling point of thionyl chloride. The product is then distilled away from residual reagents and high boiling oxides and other impurities and further treated in any of the known ways to purify it.

In the foregoing it is to be understood that by "oleum" is meant anhydrous sulphuric acid having dissolved therein a substantially quantity of sulphur trioxide, also commonly known as "fuming sulphuric acid," not to be confused with commercial "100 per cent sulphuric acid," which may contain either traces of excess sulphur trioxide or traces of moisture.

I claim as my invention:

1. The process for production of thionyl chloride, hydrogen chloride and sulphur dioxide which comprises gradually adding free chlorine and oleum, consisting of anhydrous sulphuric acid having dissolved therein sulphur trioxide in amount materially greater than the sulphur trioxide, if any, contained in so-called "100 per cent sulphuric acid," to a body of reagent of the group consisting of sulphur monochloride, sulphur dichloride and mixtures of the two, with agitation and cooling to maintain the temperature of the reaction mixture at not over 45° C. while venting off the gaseous products, and recovering the thionyl chloride from the resulting liquid reaction mixture.

2. The process for production of thionyl chloride, hydrogen chloride and sulphur dioxide which comprises gradually adding free chlorine and oleum, consisting of anhydrous sulphuric acid having dissolved therein not less than one mol of sulphur trioxide per mol of sulphuric acid, to a body of reagent of the group consisting of sulphur monochloride, sulphur dichloride and mixtures of the two, with agitation and cooling to maintain the temperature of the reaction mixture at not over 45° C., while venting off the gaseous products, and recovering the thionyl chloride from the resulting liquid reaction mixture.

3. The process for production of thionyl chloride, hydrogen chloride and sulphur dioxide which comprises gradually adding free chlorine and oleum, consisting of anhydrous sulphuric acid having dissolved therein substantially 2.8 mols of sulphur trioxide per mol of sulphuric acid, to a body of reagent of the group consisting of sulphur monochloride, sulphur dichloride and mixtures of the two, with agitation and cooling to maintain the temperature of the reaction mixture at not over 45° C., while venting off the gaseous products, and recovering the thionyl chloride from the resulting liquid reaction mixture.

4. The process for production of thionyl chloride, hydrogen chloride and sulphur dioxide which comprises gradually adding free chlorine and oleum, consisting of anhydrous sulphuric acid having dissolved therein sulphur trioxide in amount materially greater than the sulphur trioxide, if any, contained in so-called "100 per cent sulphuric acid," to a body of reagent of the group consisting of sulphur monochloride, sulphur dichloride and mixtures of the two, with agitation and cooling to maintain the temperature of the reaction mixture at substantially 25° C., while venting off the gaseous products, and recovering the thionyl chloride from the resulting liquid reaction mixture.

5. The process for production of thionyl chloride, hydrogen chloride and sulphur dioxide which comprises gradually adding free chlorine and oleum, consisting of anhydrous sulphuric acid having dissolved therein sulphur trioxide in amount materially greater than the sulphur trioxide, if any, contained in so-called "100 per cent sulphuric acid," to a body of reagent of the group consisting of sulphur monochloride, sulphur dichloride and mixtures of the two, with agitation and cooling, while regulating the rate of admission of chlorine and oleum and the cooling to maintain the temperature of the reaction mixture at not over 45° C. and venting off the gaseous products, and recovering the thionyl chloride from the resulting liquid reaction mixture.

6. The process for production of thionyl chloride, hydrogen chloride and sulphur dioxide which comprises gradually adding free chlorine and oleum, consisting of anhydrous sulphuric acid having dissolved therein sulphur trioxide in amount materially greater than the sulphur trioxide, if any, contained in so-called "100 per cent sulphuric acid," to a body of reagent of the group consisting of sulphur monochloride, sulphur dichloride and mixtures of the two, with agitation and cooling to maintain the temperature of the reaction mixture at not over 45° C., and distilling the thionyl chloride from the resulting liquid reaction mixture.

7. The process for production of thionyl chloride, hydrogen chloride and sulphur dioxide which comprises gradually adding free chlorine and oleum, consisting of anhydrous sulphuric acid having dissolved therein sulphur trioxide in amount materially greater than the sulphur trioxide, if any, contained in so-called "100 per cent sulphuric acid," to a body of reagent of the group consisting of sulphur monochloride, sulphur dichloride and mixtures of the two, with agitation and cooling to maintain the temperature of the reaction mixture at not over 45° C., while venting off the gaseous products, until a slight excess of chlorine and oleum for completion of the reaction have been added, raising the liquid reaction mixture to refluxing temperature, continuing the refluxing until the temperature has become stabilized, and recovering the thionyl chloride from the resulting liquid reaction mixture.

JOHN P. EDWARDS.